United States Patent

[11] 3,596,174

| [72] | Inventor | La Vern Bernard Hovenga<br>Davenport, Iowa |
|---|---|---|
| [21] | Appl. No. | 848,149 |
| [22] | Filed | Aug. 7, 1969 |
| [45] | Patented | July 27, 1971 |
| [73] | Assignee | Deere & Company<br>Moline, Ill. |

[54] TESTING APPARATUS FOR INTERNAL COMBUSTION ENGINE IGNITION SYSTEM
6 Claims, 1 Drawing Fig.

[52] U.S. Cl. .................................................. 324/17, 315/209 SC
[51] Int. Cl. .................................................. G01m 15/00
[50] Field of Search ........................................ 324/15–18, 73, 158 MS; 315/209, 218; 73/116–119; 123/148 E

[56] References Cited
UNITED STATES PATENTS

| 2,089,917 | 8/1937 | Mitchell .................. | 324/16 |
| 2,508,367 | 5/1950 | Bloom ..................... | 324/16 |
| 3,219,877 | 11/1965 | Konopa .................... | 315/209 |
| 3,308,801 | 3/1967 | Motto ...................... | 315/209 |

*Primary Examiner*—Michael J. Lynch
*Attorneys*—H. Vincent Harsha, Harold M. Knoth, William A. Murray, John M. Nolan and Raymond L. Hollister

ABSTRACT: A portable ignition tester for isolating ignition problems to the alternator output or the solid state capacitor discharge ignition. The alternator test circuit is applied directly across the alternator terminals and consists of an incandescent light bulb which will glow when the alternator is operated at cranking speed if the alternator output is high enough to operate the ignition system. The ignition test circuit consists of a transistor battery, a switch, and a neon bulb. The battery replaces the alternator as a voltage source and momentary closing of the switch charges the ignition capacitor for one firing. With the neon bulb connected to the high voltage spark plug wire, discharging the capacitor will fire the neon bulb once if the ignition is working properly.

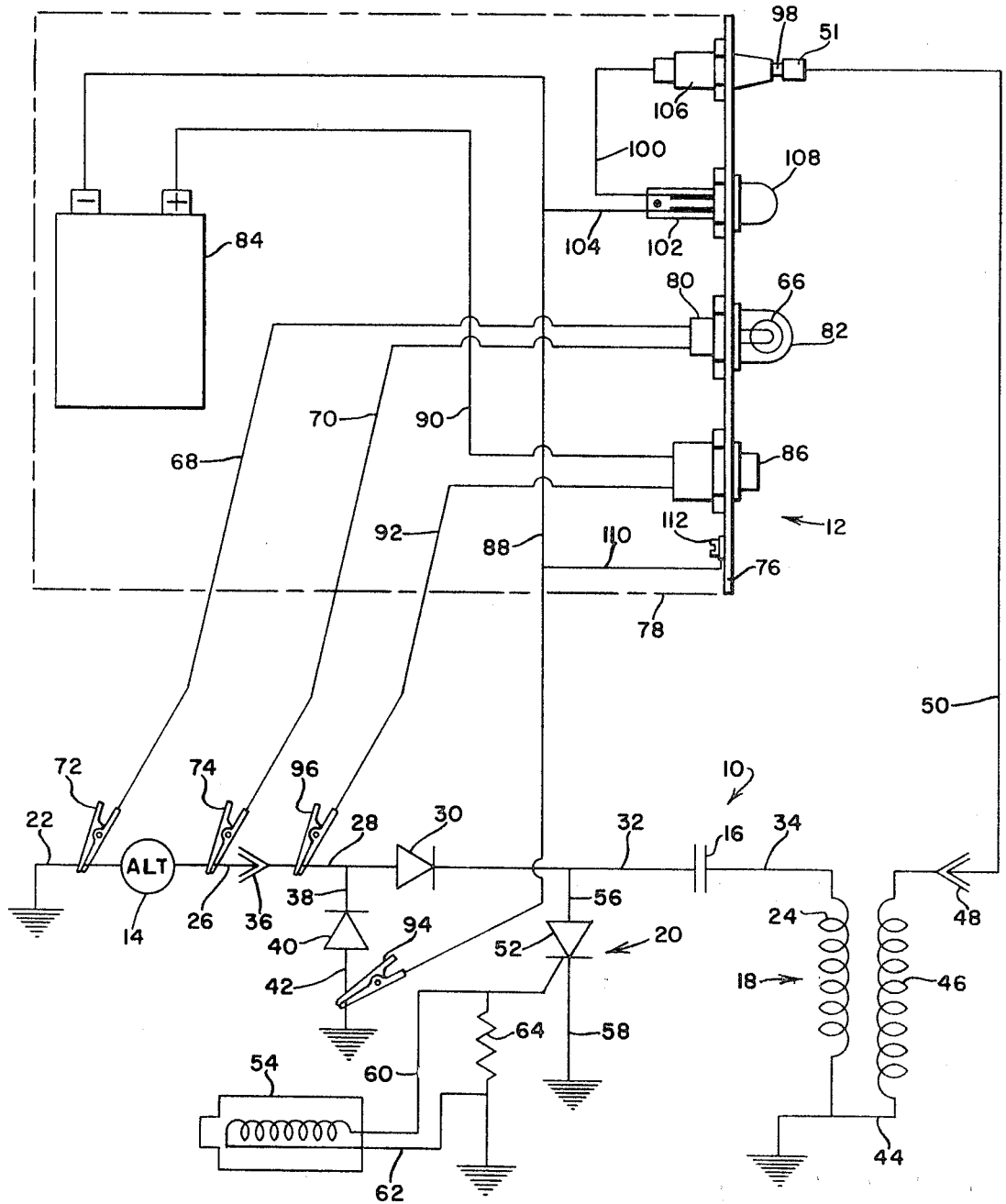

3,596,174

1

TESTING APPARATUS FOR INTERNAL COMBUSTION ENGINE IGNITION SYSTEM

BACKGROUND OF THE INVENTION

The present invention relates generally to testing solid state ignition systems for internal combustion engines.

One of the more popular types of solid state ignition systems presently in use is that referred to as a capacitor discharge system. The capacitor discharge ignition systems are extremely simple in design, and service and trouble shooting thereof is basically a work or no work diagnosis.

Prior to the present invention, there has been no simple instrument for testing solid state ignition systems, the few such instruments that were available were expensive to manufacture, extremely complicated to operate, and not portable in the sense that a mechanic could take it with him when working on an engine somewhere other than in the shop. The lack of an inexpensive, compact and portable tester had a tendency to encourage replacement of solid state ignition systems as a substitute for the work or no work diagnosis.

SUMMARY OF THE INVENTION

An object of the present invention is to provide testing apparatus for internal combustion engines which will isolate an ignition system problem to the alternator output or to the solid state ignition.

A further object of the present invention is to provide a tester for solid state ignitions which is small, portable, economic to manufacture, and simple to operate.

Yet another object of the present invention is to provide a simple tester for solid state ignition systems which operates on a conventional transistor battery so as to be usable in areas where a live source of electrical energy is not available.

Still another object of the present invention is to provide a tester for solid state capacitor discharge ignition systems which can be used to test both engine or bench-mounted systems.

The above and additional objects and advantages of the present invention will become apparent along with the details of construction of a preferred embodiment of the invention from a reading of the following detailed description when taken in conjunction with the accompanying drawing.

BRIEF DESCRIPTION OF THE DRAWING

The single FIG. of the drawing is a schematic diagram of a solid state capacitor discharge ignition system and the circuitry of a tester constructed in accordance with the present invention.

DESCRIPTION OF THE PREFERRED EMBODIMENT

Referring to the drawing, there is shown a solid state capacitor discharge ignition system 10 and a tester 12. The ignition system is of conventional construction and generally includes an alternator 14, capacitor 16, coil 18, and switch 20. One of the terminals of the alternator 14 is connected to ground by a conductor 22 and the other terminal of the alternator is connected to one terminal of the primary winding 24 of the coil 18 by conductors 26 and 28, a rectifier 30, a conductor 32, a capacitor 16 and a conductor 34. The conductors 26 and 28 are releasably connected together as at 36 and the conductor 28 is also connected to ground through a conductor 38, a diode clamp 40 and a conductor 42.

The second terminal of the primary winding 24 is connected to ground by a conductor 44 as is one terminal of the secondary winding 46. The second terminal of the secondary winding 46 is releasably connected as at 48 to a high tension wire 50 which would normally be connected to the engine spark plug on a single cylinder engine by a cap 51 or to the distributor on a multiple cylinder engine.

The switch 20 includes a silicon-controlled rectifier 52 which can be triggered by a magnetic pickup head 54. The silicon-controlled rectifier 52 is connected between the conductor 32 and ground by conductors 56 and 58 respectively while the two terminals of the magnetic pickup head 54 are connected to the silicon-controlled rectifier 52 and ground by conductors 60 and 62 respectively. The conductors 60 and 62 are interconnected by a resistor 64 which prevents premature or accidental triggering of the silicon-controlled rectifier 52. When the above-described ignition system is mounted on an engine, the magnetic pickup head 54 is mounted adjacent the flywheel which is provided with one or more metallic protrusions which will pass closely adjacent to the head 54 on each revolution of the flywheel to set up an induced voltage within the pickup head.

The operation of the solid state capacitor discharge ignition system is basically as follows. When the engine is turned over, the alternator supplies an alternating current which is converted to a direct current by the rectifier 30. The direct current in turn charges the capacitor 16. When the protrusion on the engine flywheel passes by the magnetic pickup head 54, it induces a voltage in the head 54 which triggers or closes the silicon-controlled rectifier 52. With switch 20 closed, the charge or voltage stored in the capacitor 16 is released across the coil 18 where it is instantaneously stepped up, passed through the high tension wire 50 and discharged across the electrodes of the engine spark plug.

The tester 12 consists essentially of an alternator test circuit, an ignition charge circuit, and an ignition test circuit. The alternator test circuit includes a load in the form of an incandescent light bulb 66 and a pair of conductors 68 and 70 connected to the terminals of the bulb 66. The ends of the conductors 68 and 70 are adapted to be connected across the terminals of the alternator by clips 72 and 74. The light bulb 66 is mounted in the front panel 76 of a tester case 78 by a socket member 80, and is protected by a translucent dome 82. When the engine is turned over at cranking speed, the bulb 66 will glow if the alternator output is high enough to operate the ignition system.

The ignition charge circuit consists of a nine volt transistor battery 84 mounted in the case 78, a push button switch 86 mounted in the front panel 76 of the case 78, and conductors 88, 90 and 92. The conductor 88 has one end connected to the negative terminal of the battery 84 and is provided with a clip 94 at its opposite end, the conductor 90 is connected between the positive terminal of the battery 84 and one terminal of the switch 86, and the conductor 92 has one end connected to the second terminal of the switch 86 and is provided with a clip 96 at its opposite ends. The charge circuit is adapted to be connected across the capacitor 16, and to this end the clips 94 and 96 are illustrated as being connected to the conductors 42 and 28 respectively. However, it should be noted that conductor 88 can be connected to ground at any position and that the conductor 92 can be connected to the ignition circutry anywhere on the opposite side of the capacitor 16.

The ignition system is charged for one firing by momentarily closing the push button switch 86 to apply the nine volts of the battery 84 across the capacitor 16. Since the battery 84 replaces the alternator as a voltage source to charge the ignition system, the ignition system can be charged when it is engine or bench-mounted.

If the tester 12 is to be used to diagnose an ignition system having a polarity opposite to the polarity of the illustrated ignition system, it is only necessary to reverse the connections of the conductors 88 and 92. Specifically, the clip 96 would be applied directly to ground and the clip 94 would be applied to the opposite side of the capacitor 16.

The ignition test circuit consists essentially of the high tension wire 50, a binding post 98, a conductor 100, a neon lamp 102, a conductor 104, and the conductor 88. The binding post 98 is mounted in the front panel 76 of the case 78 and is insulated therefrom by a sleeve 106. The neon lamp 102 is connected between the binding post 98 and the conductor 88 by the conductors 100 and 104, respectively, is mounted on the front panel 76 of the case 78, and is protected by a translucent dome 108. The test circuit is completed by mounting the cap 51 on the binding post 98.

With the cap 51 connected to the binding post 98, the clip 94 connected to ground, and the capacitor 16 charged in the manner described above, the ignition system can be tested by passing a metallic object past the magnetic pickup head 54. If the ignition system is engine-mounted, this merely involves turning over the engine, and if the ignition system is bench-mounted, a screw driver or similar tool is sufficient. The metallic object passing by the magnetic pickup head induces a voltage therein which triggers the silicon-controlled rectifier 52 and applies the voltage stored in the capacitor 16 across the primary winding 24 of coil 18. The voltage applied across the primary winding 24 induces a high voltage across the secondary winding 46 which fires the neon lamp once if the ignition is working properly. If the ignition system is not functioning properly due to a short or the like, the nine volts supplied by the battery 84 will not induce a voltage across the secondary winding which is high enough to fire the neon lamp.

As a safety measure, the casing 78 is grounded by a conductor 110 which has one end connected to the conductor 88 and its other end clamped to the front panel 76 by a screw 112.

The above-described tester also has the inherent capability of testing some of its own circuits. For example, the alternator test circuit can be employed to test the ignition charge circuit and the ignition charge circuit can be used to test the alternator test circuit. This is accomplished by clamping the clips 72 and 74 to the clips 94 and 96, respectively, to form a circuit including the battery 84, incandescent lamp 66 and switch 86. With the clips so connected, the lamp 66 will glow when the switch 86 is closed and both the alternator test circuit and ignition charge circuit are functioning properly.

From the foregoing, it can be seen that the present invention provides a compact and portable self-contained ignition tester which is simple to operate, provides the basic work or no work diagnosis required for solid state capacitor discharge ignition systems, and can be used to test some of its own components.

While only a single preferred embodiment of the present invention has been described and illustrated, various modifications within the spirit and scope of the invention will be obvious to those skilled in the art and can be made without departing from the underlying principles of the invention.

I claim:

1. In combination with the ignition circuitry of an internal combustion engine having a coil with primary and secondary windings, a capacitor for receiving and storing an electrical charge, and a solid state switch for periodically releasing the electrical charge from the capacitor and applying the same across the primary winding of the coil, testing apparatus comprising: a charge circuit including a low voltage source and a manual, normally open switch; means connecting the charge circuit across the capacitor to charge the capacitor upon momentary closing of the switch; a test circuit including indicating means responsive to a predetermined minimum voltage to supply a positive signal; and means connecting the test circuit to the secondary winding of the coil to provide a positive signal upon triggering the solid state switch if the ignition circuitry is operative.

2. The apparatus set forth in claim 1 wherein the indicating means includes a gas-filled lamp connected across the secondary winding of the coil.

3. A portable self-contained tester for providing a work or no work diagnosis of an engine or bench-mounted solid state capacitor discharge ignition system including a coil having primary and secondary windings, a capacitor for receiving and storing an electrical charge, and a solid state switch for periodically releasing the electrical charge from the capacitor and applying the same across the primary winding of the coil, the tester comprising: a casing having a front panel; a battery mounted in the casing; first and second conductor means connected to the terminals of the battery and including means releasably connecting the conductor means on opposite sides of the capacitor; a normally opened manual switch means mounted in the front panel and interposed in the first conductor means to charge the capacitor upon momentary closing of the switch a gas-filled lamp mounted in the front panel; and means including the second conductor means releasably connecting the lamp across the secondary winding of the coil to fire the lamp upon triggering the solid state switch if the ignition system is functioning properly.

4. The tester set forth in claim 3 wherein the means releasably connecting the lamp across the secondary winding of the coil further includes a binding post mounted in the front panel, a third conductor means within the casing interconnecting the binding post and one terminal of the lamp, a fourth conductor means within the casing interconnecting the second terminal of the lamp and the second conductor means, and a high tension wire interconnecting the secondary winding of the coil and the binding post.

5. The tester set forth in claim 4 further including means grounding the casing to the second conductor.

6. A portable self-contained tester for diagnosing ignition problems in a solid state capacitor discharge ignition system of the type including an alternator for supplying an electrical charge, a capacitor for receiving and storing an electrical charge, a coil having primary and secondary windings, and a solid state switch for periodically releasing the electrical charge from the capacitor and applying the same across the primary winding of the coil, the tester comprising: a casing having a front panel; an incandescent lamp mounted in the front panel; first and second conductors connected to the terminals of the incandescent lamp; means on the first and second conductors releasably connecting the conductors to the terminals of the alternator whereby, if the alternator is functioning the incandescent lamp will glow; a battery within the casing; first and second conductor means connected to the terminals of the battery and including means releasably connecting the first and second conductor means to the opposite sides of the capacitor; a normally opened manual switch means mounted in the front panel and interposed in the first conductor means whereby momentary closing of the sw'tch effects charging of the capacitor; a gas-filled lamp mounted in the front panel; and means including one of the first and second conductor means releasably connecting the gas-filled lamp across the secondary winding of the coil; whereby, upon triggering the solid state switch, the gas-filled lamp will fire if the ignition system is functioning properly.

UNITED STATES PATENT OFFICE
CERTIFICATE OF CORRECTION

Patent No. 3,596,174          Dated 27 July 1971

Inventor(s) LaVern Bernard Hovenga

It is certified that error appears in the above-identified patent and that said Letters Patent are hereby corrected as shown below:

Column 4, line 18, after "switch" insert a semi-colon.

Signed and sealed this 29th day of February 1972.

(SEAL)
Attest:

EDWARD M. FLETCHER, JR.          ROBERT GOTTSCHALK
Attesting Officer                Commissioner of Patents